United States Patent
Bax (10) Patent No.: US 6,952,071 B2
(45) Date of Patent: Oct. 4, 2005

(54) PIEZO-ELECTRIC DEVICE

(75) Inventor: Pieter Johannes Bax, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 25 days.

(21) Appl. No.: 10/276,784

(22) PCT Filed: Mar. 20, 2002

(86) PCT No.: PCT/IB02/00967
§ 371 (c)(1),
(2), (4) Date: Nov. 19, 2002

(87) PCT Pub. No.: WO02/075913
PCT Pub. Date: Sep. 26, 2002

(65) Prior Publication Data
US 2003/0177642 A1 Sep. 25, 2003

(30) Foreign Application Priority Data
Mar. 21, 2001 (DE) .......................... 101 13 660

(51) Int. Cl.⁷ .............................................. H01L 41/08
(52) U.S. Cl. ................................................. 310/323.02
(58) Field of Search ............................. 310/323.02, 328

(56) References Cited

U.S. PATENT DOCUMENTS

| | | | |
|---|---|---|---|
| 4,019,073 A | | 4/1977 | Vishnevsky et al. |
| 4,400,641 A | * | 8/1983 | Vishnevsky et al. ... 310/323.02 |
| 4,453,103 A | * | 6/1984 | Vishnevsky et al. ... 310/323.02 |
| 4,814,660 A | * | 3/1989 | Yamada et al. ............. 310/328 |
| 4,959,580 A | | 9/1990 | Vishnevsky et al. |
| 5,233,257 A | | 8/1993 | Luthier et al. |
| 5,332,941 A | * | 7/1994 | Honda .................... 310/323.02 |
| 5,631,517 A | * | 5/1997 | Kato et al. ............. 310/323.02 |
| 5,719,461 A | * | 2/1998 | Peclat et al. ........... 310/323.02 |
| 6,121,717 A | * | 9/2000 | Diefenbach et al. ... 310/323.02 |

FOREIGN PATENT DOCUMENTS

| | | | |
|---|---|---|---|
| EP | 0301429 A2 | 2/1989 | .......... H01L/41/08 |
| EP | 0557106 A1 | 8/1993 | .......... H01L/41/09 |
| JP | 05049271 A | 2/1993 | ............ H02N/2/00 |

* cited by examiner

Primary Examiner—Mark Budd (57) ABSTRACT

The present invention relates to a piezo-electric drive consisting of a stator (2) and a rotor (4). It is characterized by the following features:

It is provided that the stator (2a) has a cylindrical piezo-element (2) that has at least two electrodes and at least one contact surface (2b) and a first resonant frequency, the rotor has a mechanical transfer element (1) between the piezo-element (2) and the rotor (4), which transfer element (1) has elevations (3) that point at a particular angle into the direction of the contact surface (2b) of the piezo-element (2) and under pretension are adjacent to the contact surface (2b) and that have a second resonant frequency, and said piezo-element (2a) is provided to stimulate vibrations of the second resonant frequency in the elevations (3) by periodic exertion of pressure on the elevations (3), whereby the elevations (3) periodically lift-off from the contact surface (2b) and the rotor (4) is set into rotation.

17 Claims, 11 Drawing Sheets

PIEZO-ELECTRIC DEVICE

The present invention relates to a piezo-electric drive comprising a stator and a rotor.

EP 0 557 106 discloses a piezo-electric drive which has a stator containing a piezo-element with several electrodes on both sides for control, and with an annular rotor with several slide elements touching the stator. The rotor is set in motion by a travelling wave which is produced by triggering the electrodes in the piezo-element of the stator.

U.S. Pat. No. 4,959,580 discloses a further piezo-electric drive consisting of a stator comprising a circular rotor. In the shaft of the stator and rotor is mounted a piezo-electric element connected with the stator via a casing and which performs radial oscillations. Mounted on the piezo-electric element are spring elements known as pushers which act on the rotor and set this in rotation.

U.S. Pat. No. 4,453,103 also discloses a similar piezo-electric drive. This also works with spring elements known as pushers mounted on the side of the piezo-element.

The object of the present invention is to create a piezo-electric drive structured as simply as possible, which allows simple control of the piezo-element and has a high efficiency.

The object is achieved according to the invention in that the stator (2a) has a cylindrical piezo-element (2) that has at least two electrodes and at least one contact surface (2b) and a first resonant frequency, the rotor has a mechanical transfer element (1) between the piezo-element (2) and the rotor (4), which transfer element (1) has elevations (3) that point at a particular angle into the direction of the contact surface (2b) of the piezo-element (2) and under pretension are adjacent to the contact surface (2b) and that have a second resonant frequency, and said piezo-element (2a) is provided to stimulate vibrations of the second resonant frequency in the elevations (3) by periodic exertion of pressure on the elevations (3), whereby the elevations (3) periodically lift-off from the contact surface (2b) and the rotor (4) is set into rotation.

To set the rotor of a piezo-electric drive in motion, two resonant frequencies are required in different vibration planes. The two resonant frequencies can be stimulated electrically, for which at least four trigger electrodes are required on the piezo-electric element. Also the supply of the electrodes must have two AC voltages carefully matched to each other. The arrangement according to the invention offers the advantage that only two electrodes need be supplied with an AC voltage, so a relatively simple control circuit is sufficient. The second resonant frequency is excited in a mechanical manner in the mechanical transfer element. Due to the elevations on the transfer element, the mechanical resonant frequency is superimposed by the electrical resonant frequency of the stator, thus setting the rotor in rotary motion. As the mechanical transfer element must transfer the rotary motion to the rotor, it is connected to the rotor. As such a piezo-electric drive can be built both as a radial motor and an axial motor, it is versatile in use. The radial motor is also used with a rotor as an inner runner or an outer runner. In the radial motor the contact surfaces of the piezo-element with elevations are on the cylindrical outside or inside of the piezo-element which is surrounded by the elevations in the radial direction or surrounds the elevations radially. If the drive is built as an axial motor the contact surfaces are on a side wall of the piezo-element so that the piezo-element is pressed sideways against the elevations of the transfer element. In principle the invention offers the advantage that large vibration amplitudes are possible and the friction between the piezo-element and elevations is low, as the elevations periodically lift off from the piezo-element.

With the embodiment as claimed in claim 2, the efficiency of the piezoelectric drive is brought to an optimum. For this purpose the resonant frequencies of the piezo-element and mechanical transfer unit correspond as closely as possible or are a multiple of each other. In practice this ideal state cannot be fully achieved due to tolerances and wear phenomena, but is nevertheless desirable.

Also the embodiment as claimed in claim 3 serves to achieve maximum efficiency. The elevations are pressed onto the contact surface of the piezo-element where they are subjected to a force vertical to the contact surface known as the pretension force. In order for the elevations to move further over the contact surface with minimum friction and hence loss, they must be evenly loaded. Therefore the same pretension force must act on all elevations.

With the embodiment as claimed in claim 4 continuous rotary motion is possible with as few elevations as possible on the mechanical transfer element. In order for the rotor to run true, the elevations must be arranged at regular intervals on the transfer element, which means for three elevations a spacing of one-third of the circumference of the transfer element. It is also possible to use more than three elevations.

The embodiment as claimed in claim 5 allows a particularly compact rotor which ensures that the rotary motion of the transfer element is transferred to the rotor without loss. Such a rotor is particularly stable and thus reduces vibrations.

The embodiment as claimed in claim 6 offers the advantage that the wear by rubbing of the contact surfaces of the piezo-element is reduced. This is achieved by fitting a resistant coating on the contact surface. The less the contact surface wears, the lower the efficiency loss during the life of the piezo-electric drive and the more stable the drive behaves over its entire life.

With the embodiment as claimed in claim 7 the transfer element in a radial motor always has a pretension in relation to the stator and hence a particularly good efficiency. No additional spring is required such as is necessary in an axial motor to pretension the transfer element against the stator.

In the embodiment as claimed in claim 8 the piezo-electric drive is operated without bearings as a radial motor. This ensures particularly simple and economic structure. As the rotor cannot move away from the piezo-element in the radial direction, the rotor need merely be guided in axial direction. This is achieved simply as the rotor is connected to the shaft to be driven or an axial movement of the rotor is otherwise prevented. Here it is important that possibly no forces act on the rotor in the radial direction, else untrue running with associated vibration cannot be avoided.

Claim 9 describes a simple manner of assembling a piezo-electric drive according to the invention if designed as radial motor. As the rotor with transfer element forms a closed figure and must be pretensioned relative to the stator, it has a smaller internal diameter than the external diameter of the stator. Consequently, the internal diameter of the rotor must be expanded for mounting the rotor on the stator. As the internal diameter of the rotor is determined by the elevations of the transfer element, pressure is now exerted on the rotor at several points while the rotor with transfer elements deforms elastically and the elevations are deflected away to the side. Thus the effective internal diameter of the transfer element becomes larger and the rotor can be pushed onto the stator. The pressure is then removed again and the elevations re-align themselves to their original positions, whereby the rotor with transfer element is pretensioned relative to the stator. The deformation of the rotor, transfer element and elevations must naturally not exceed the reversible range.

The embodiment as claimed in claim 10 relates to a non-annular rotor and transfer element, and here too the drive is designed as a radial motor. To increase the elastic deformability of the rotor and transfer element, the rotor consists of an equilateral triangle. In the center of each side the rotor has elevations pointing to the inside which serve as transfer elements. Thus the equilateral triangle can rotate on the stator like the circular rotor. An n-sided polygon is also possible having 6, 9, 12, . . . sides. The advantage of the triangle is that the periphery of the equilateral triangle increases substantially while the same internal diameter is retained between the elevations as in the circular rotor, so that the pressure of the rotor on the stator is less and the triangular rotor can much more easily be expanded by deformation e.g. for assembly.

In the designs as claimed in claims 11 and 12 the piezo-electric drive according to the invention is used as a motor. As it is particularly light and compact and allows high rotation speeds, it is ideally suited as a gear motor in small electric devices.

The embodiment as claimed in claim 13 allows an electric shaver to be fitted with a rotating cutter tool with the advantages of piezo-electric drive according to the invention. Thus in the designs common today with three rotating cutters, all cutter tools can be designed as rotors which each rotate about a piezo-element as stator. Such an arrangement is low maintenance as no gears are required, and compact in structure. Furthermore it requires little current which again allows miniaturization and saves weight of the battery.

The embodiment as claimed in claim 14 offers the great advantage that the rotors can easily be replaced together with the cutters, as the rotor and cutter are one component. Otherwise such a shaver has no further wearing parts. As the rotor can easily be removed, particularly easy cleaning is possible.

The embodiment as claimed in claim 15 constitutes a particularly low maintenance fan which is simple to produce. This has an air screw driven directly by the piezo-electric drive and thus is particularly compact in structure. Also the drive works particularly quietly which predestines it for use as a fan in computers or projectors.

These and other aspects of the invention will be apparent from and elucidated with reference to the embodiments described hereinafter.

Figure 1:
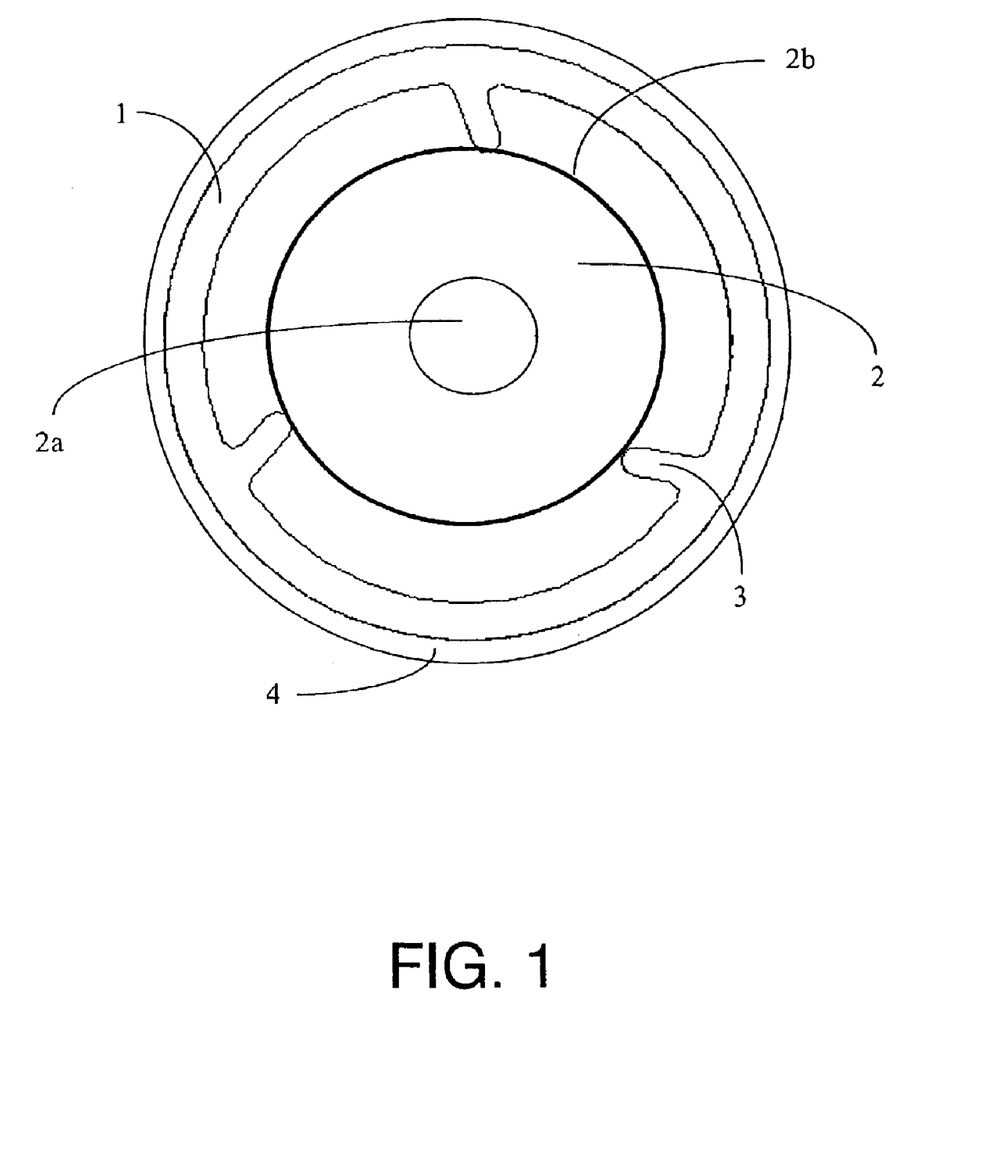
FIG. 1 shows a piezo-electric drive according to the invention as a radial motor in side view.

As can be seen in the radial motor shown in FIG. 1, the new design of piezoelectric drive consists of a stator 2a with a cylindrical piezo-element 2 and a rotor 4, where the piezo-element 2 has a contact surface 2b on the side facing the rotor 4 which is coated against wear with a wear-resistant material. The piezo-element 2 has two electrodes which allows the piezo-element 2 to contract in the axial direction when electric voltage is applied and hence expand in the radial direction. The annular or cylindrical rotor 4 has on its inside a mechanical transfer element 1 which touches the piezo-element 2 by means of three elevations 3 and is pretensioned relative to the piezo-element 2. This pretension is achieved simply in the construction as a radial motor in that the diameter of piezo-element 2 is slightly larger than the effective diameter of the circle at the three elevations 3. To set the drive in motion, an AC voltage is applied to the piezo-element 2 of stator 2a so that the piezo-element 2 then periodically contracts in axial direction. Taking into account the Poisson ratio of the piezo-element 2 it periodically expands in radial direction with an electric resonant frequency of piezo-element 2 and exerts a force on the elevations 3. These are now set in periodic vibration, begin to move on the contact surface 2b of piezo-element 4 and thus generate the required second resonant frequency in a mechanical manner. As a result rotor 4 is set in rotary motion. To trigger the piezo-element 2 only one electronic driver stage is required.

By superimposing the mechanical resonant frequency of the three elevations 3 of the transfer element 1 and the electric resonant frequency of piezo-element 2, the rotor 4 and transfer element 1 are set in rotary motion. The elevations 3 thus make small jumps on the surface of the piezo-element 2. Rotor 4 and transfer element 1 are firmly connected together or can consist of one component. As the rotor 4 is guided radially by stator 2a no additional radial bearing is required. The rotor 4 can be connected directly with an object to be rotated, e.g. a shaft. Thus the new design of piezo-electric drive is extremely low maintenance and economic.

Figure 2:
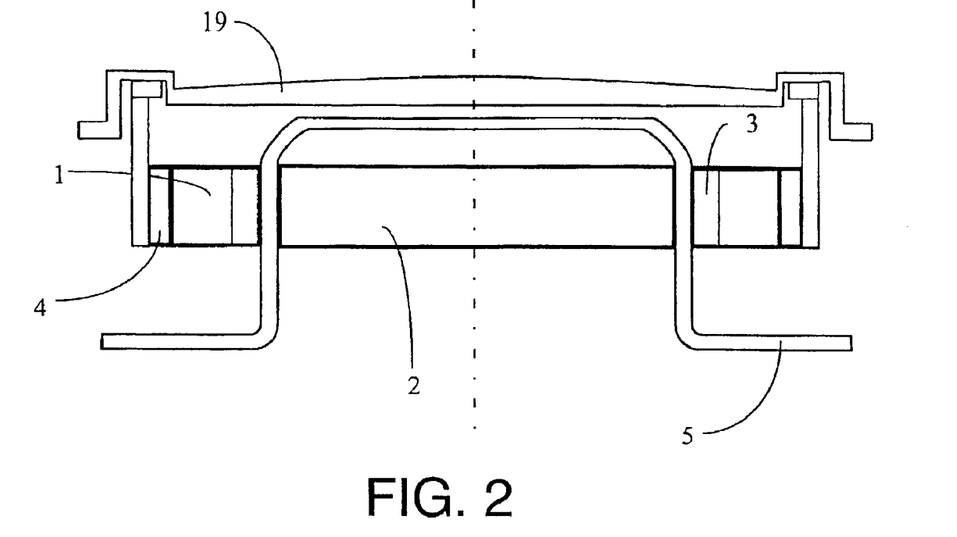
FIG. 2 shows a cross section through the piezo-electric drive in a shaver.
Figure 3:
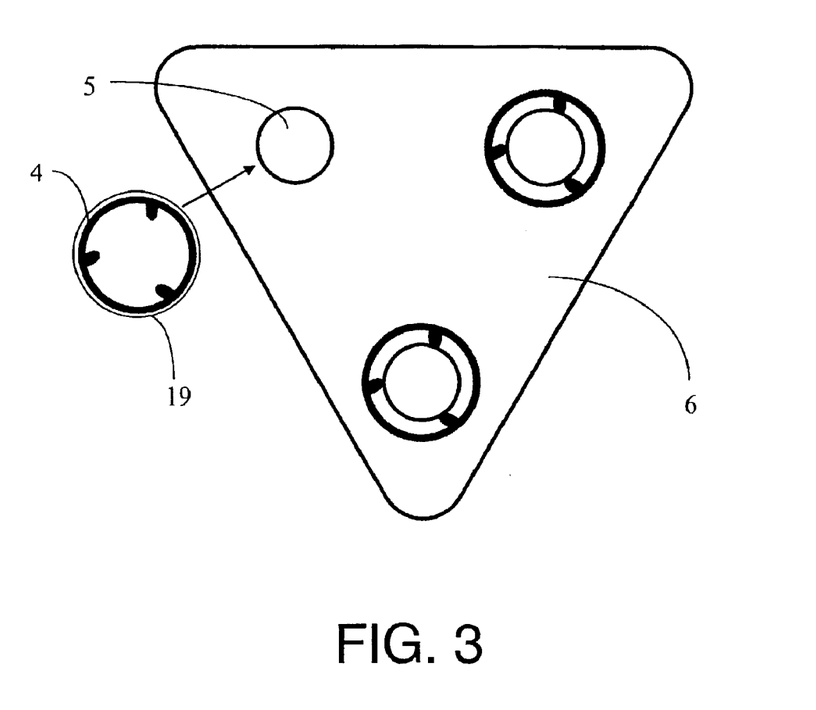
FIG. 3 shows a shaver with piezo-electric drive in top view.

It is therefore ideal for use in an electric shaver with rotating cutter heads 19. FIG. 2 shows such a cutter head 19 with direct drive. Stator 2a lies protected in a casing 5 which can also be the casing of the shaver, alternatively the casing 5 can be mounted on a carrier plate 6. The rotor 4 with transfer element 1 lies around the rotationally symmetrical casing 5. The vibrations of piezo-element 2 are here transferred by casing 5 to the transfer element 1. As a result the rotor 4 rotates with transfer element 1 about casing 5. The rotor 4 on its outside is at the same time formed as a cutter head 19 and thus removes the facial hair of a user. Thus a simple exchange of the worn cutter head 19 is possible by simply pushing a new rotor 4 over the casing 5. This is shown in FIG. 3 with a three-head shaver. The casing 5 must naturally be made of abrasion-resistant material as the transfer element 1 of the rotor 4 runs directly on the casing. Suitably the casing 5 is coated against wear.

Figure 4:
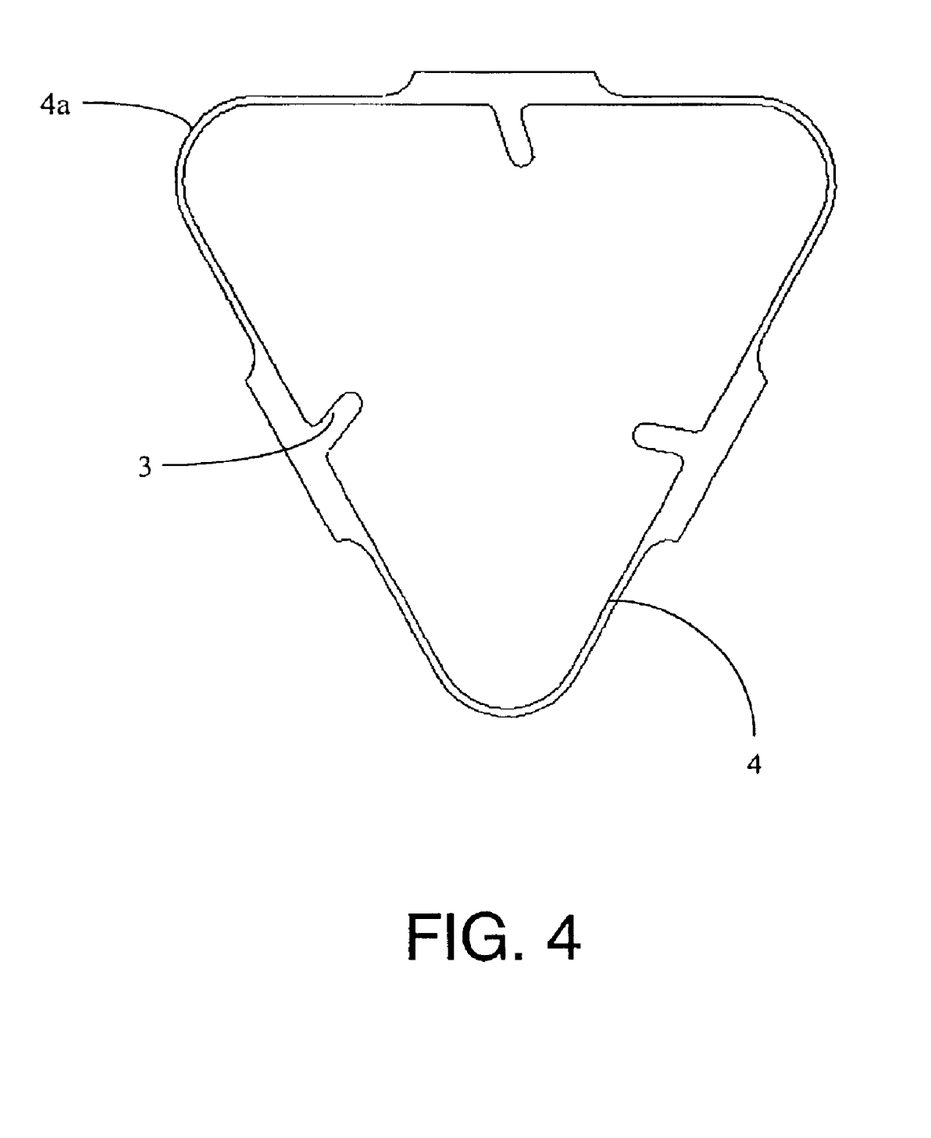
FIG. 4 shows a triangular rotor for piezo-electric drive in radial construction.

Instead of a circular rotor 4 a triangular rotor 4 is possible as in FIG. 4. Here the rotor 4 and transfer element 1 and elevations 3 are made of one component. With central positioning of the elevations 3 in an equilateral triangle, the contact points of the elevations 3 with the piezo-element 2 all lie on one escribed circle. Thus such a rotor 4 can perform even rotary movements. In comparison with the circular rotor 4 of FIG. 1 it offers the advantage that it is essentially more elastic. It can therefore be expanded more. This is particularly advantageous when mounting the rotor 4 on piezo-element 2 as the internal diameter d of rotor 4 must be expanded between elevations 3. Also the pretension in operation is less, while the drive is more efficient and more effective. Instead of a triangular rotor 4 a rotor with several corners (polygonal) is also possible. The rotor 4 can also have meander-like connections instead of the smooth connections 4a between the elevations 3, in particular connections in concertina form, so that the rotor 4 becomes even more elastic and, in a manner of speaking, spring elements are integrated with the rotor 4.

Figure 5:
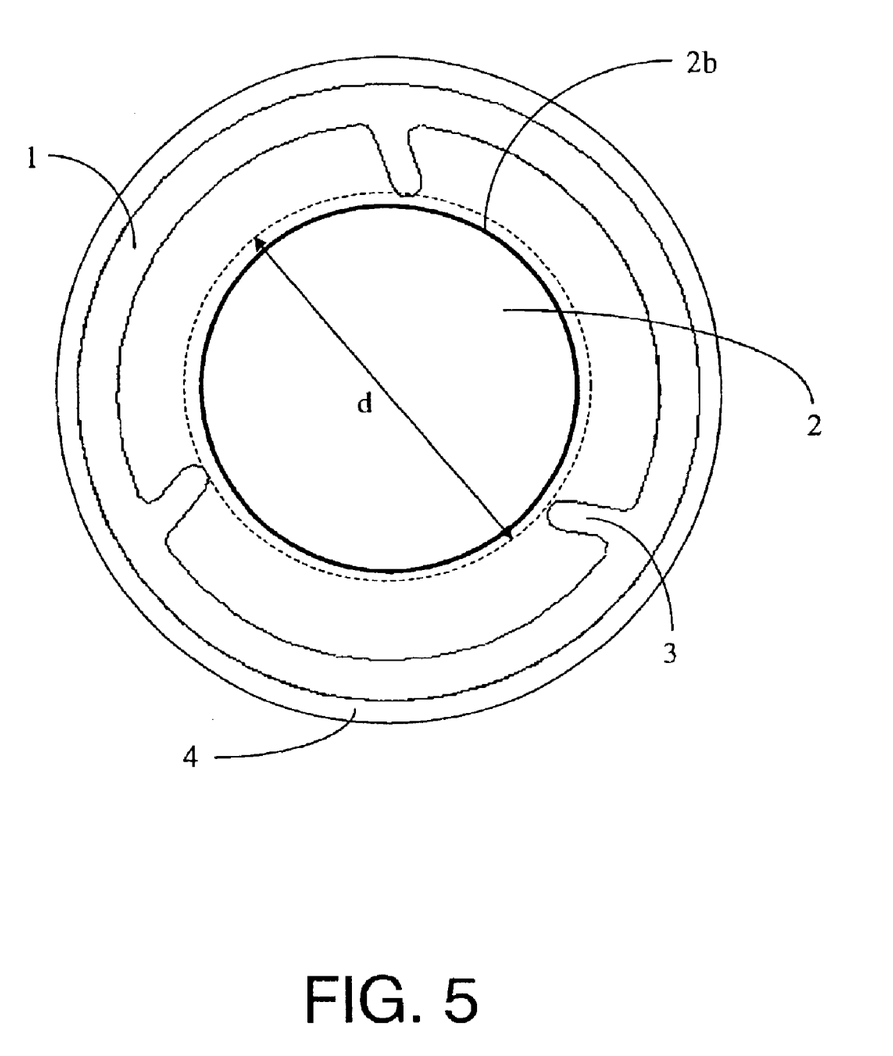
FIG. 5 shows the piezo-electric drive in radial structure with expanded circular rotor during assembly.

Mounting of a circular rotor 4 on the piezo-element 2 is shown in FIG. 5. By exerting pressure on rotor 4 at several points, the elevations 3 of the transfer element 1 move slightly aside and thus expose a greater internal diameter d. In this state the piezo-element 2 can be pushed into rotor 4. The pressure is then removed again and the rotor 4 pretensioned relative to the piezo-element 2.

Figure 6:
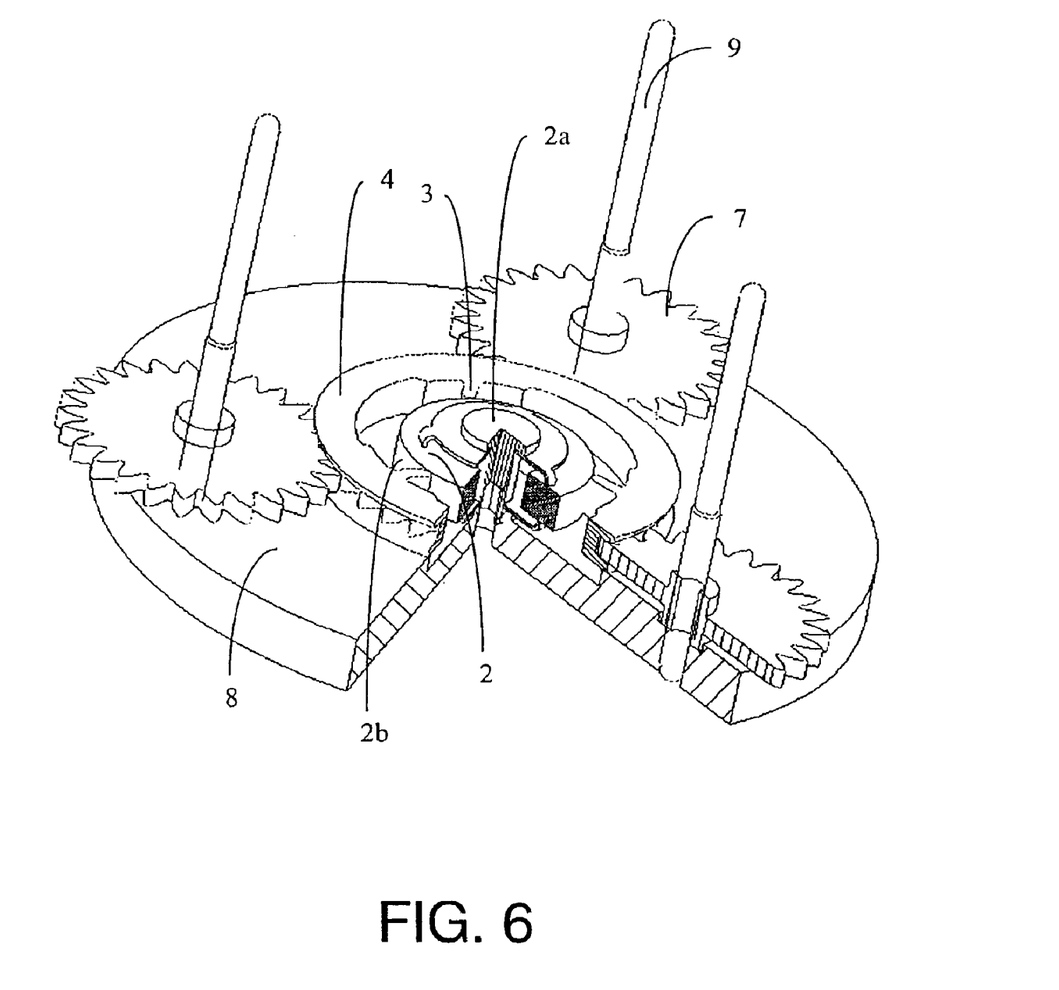
FIG. 6 shows the piezo-electric drive in a gear arrangement for a shaver with three rotating cutter heads.

If in an electric shaver, several rotating cutting heads are to be driven by a piezo-electric motor, an arrangement as in FIG. 6 is recommended. Here the piezo-element 2 is connected via a stator 2a with a mounting plate 8 which simultaneously serves for mounting shaft 9 of the rotating cutter heads. The rotor 4 is formed as a toothed wheel on its outside and thus drives the shafts via further toothed wheels 7. As the piezo-element is firmly connected to the mounting plate 8 and the shafts 7 are also mounted in the mounting plate 8, a very stable and compact arrangement is achieved which can be embodied particularly flat.

Figure 7:
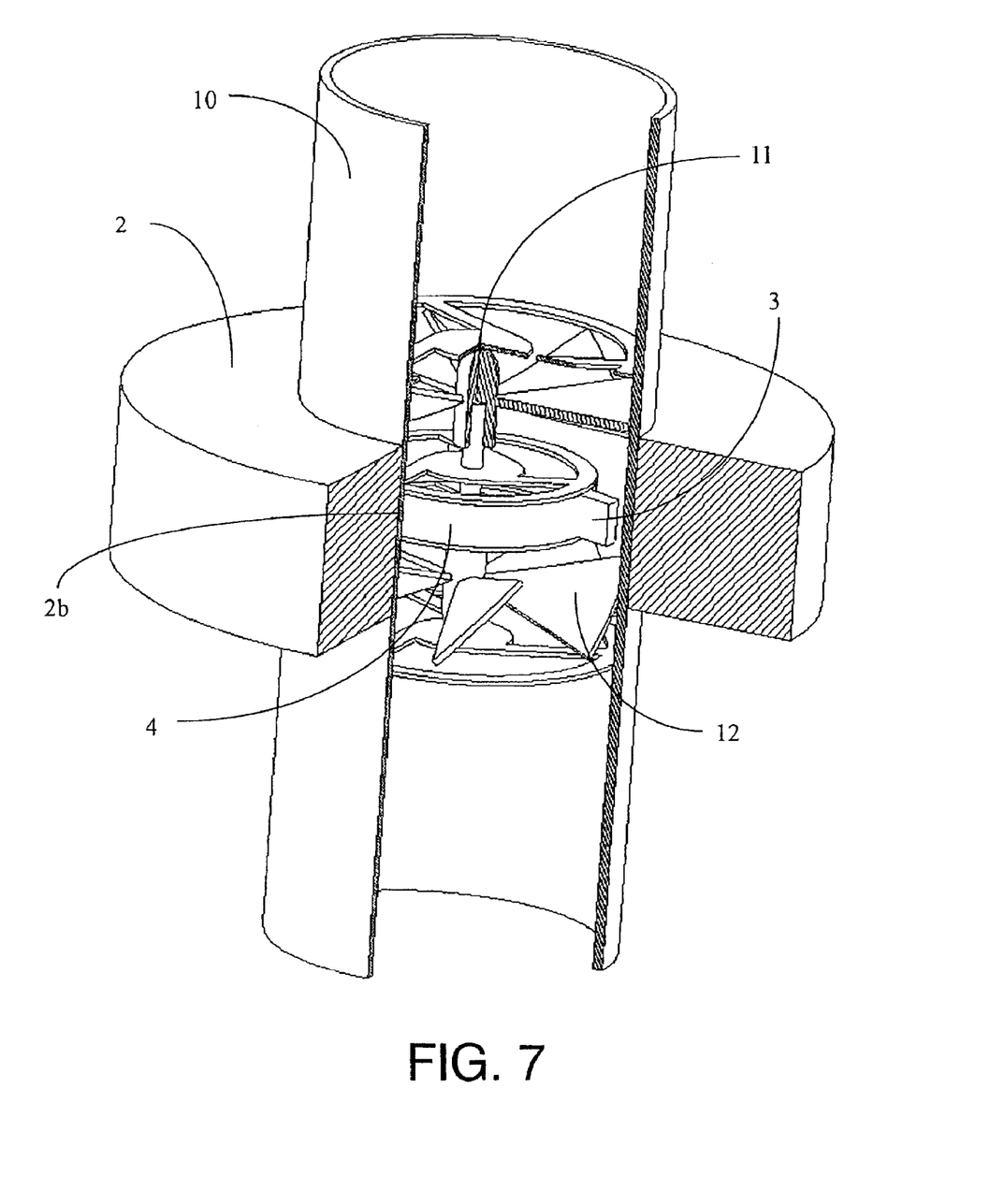
FIG. 7 shows a pump with a radial piezo-electric drive.
Figure 8:
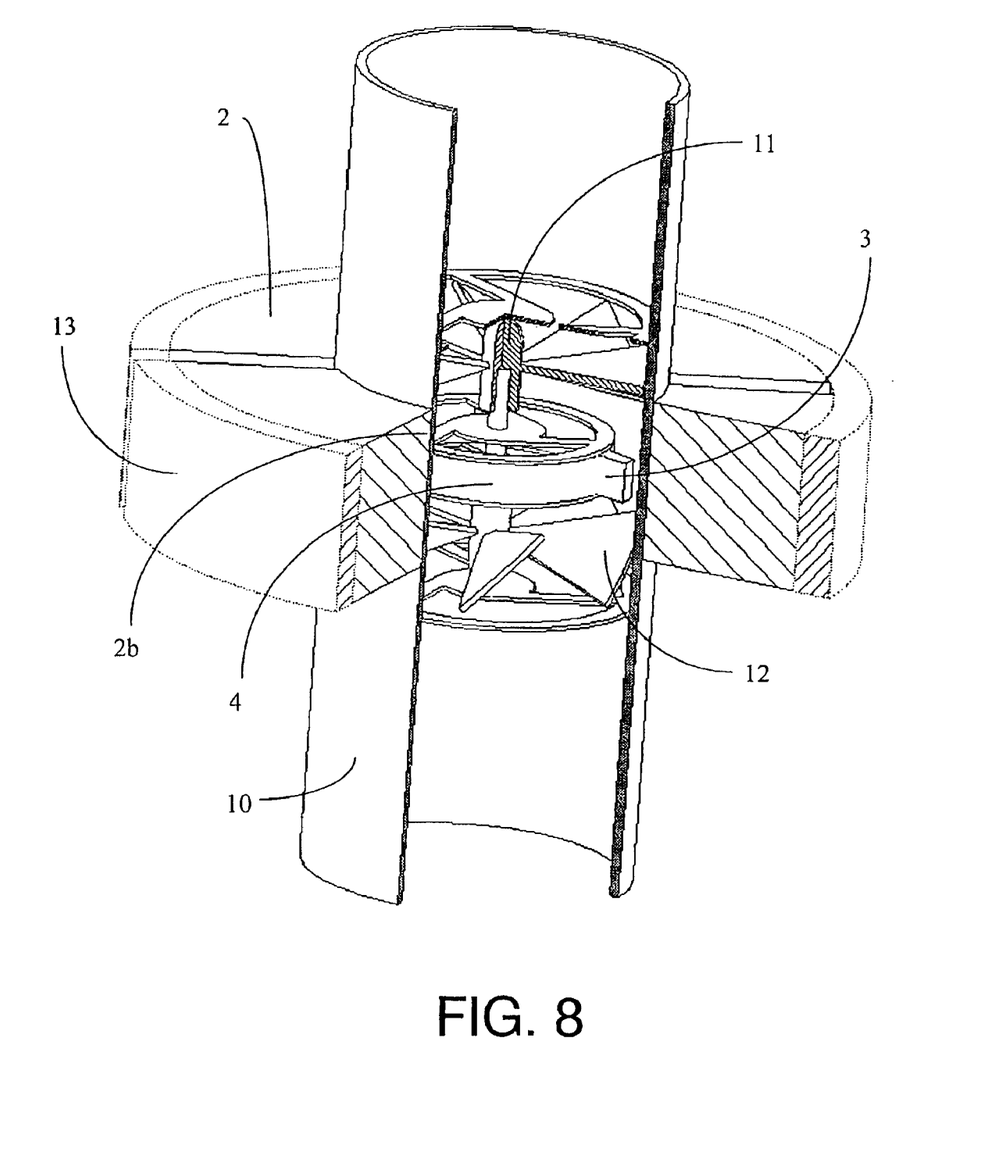
FIG. 8 shows the pump with a two-part piezo-element.

The piezo-electric drive according to the invention is ideally suited in the radial construction as a drive for a pump. Such a pump according to FIGS. 7 and 8 essentially consists of a pipe 10 which serves to transfer the goods to be conveyed. In the pipe 10 is a bearing 11 to hold the rotor 4. The rotor drives directly a turbine wheel 12 which pumps the goods through the pipe 10. To set the rotor in motion, at the level of rotor 4 outside the pipe 10 is an annular or cylindrical piezo-element 2. This piezo-element 2 sets the rotor 4 in rotary motion through the wall of pipe 10. As the elevations 3 continue to move on the inner wall of the pipe 10, the pipe 10 must consist of a wear-resistant material or, at least at the point where the elevations 3 of the rotor 4 come into contact, be fitted with a resistant coating, as the inner wall of the pipe 10 here serves simultaneously as a contact surface 2b. For easier assembly the piezo-element 2 can also consist of two components held together by an outer ring 13.

Figure 9:
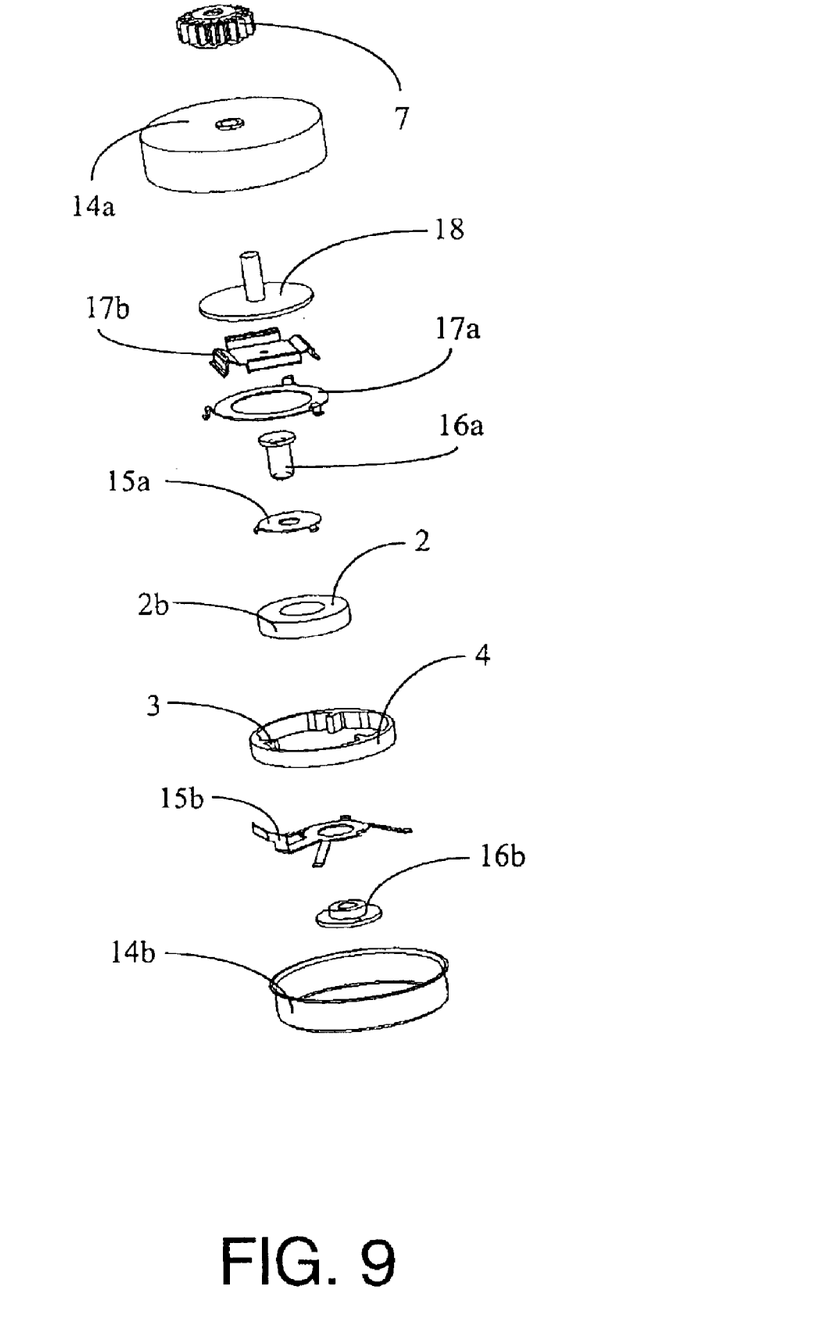
FIG. 9 shows the radial piezo-electric drive as an exploded drawing.
Figure 11:
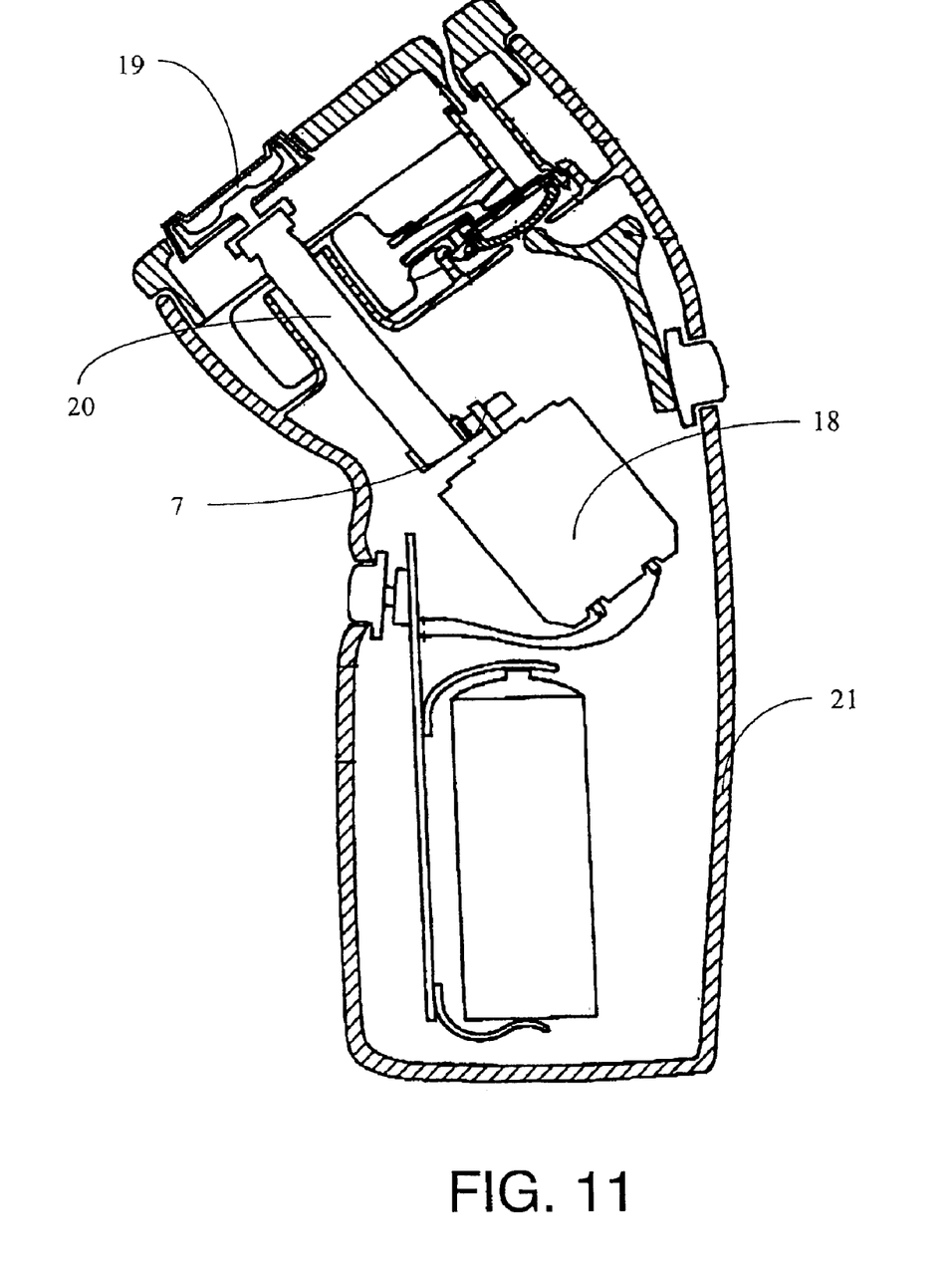
FIG. 11 shows a piezo-electric drive instead of a conventional electric motor in a shaver.

FIG. 9 shows the piezo-electric drive as a radial motor which can be used in various applications. The applications are driven via a gear wheel 7. The entire motor is fitted in a two-part casing 14a, 14b from which only gear wheel 7 protrudes and electrical connections. The piezo-element 2 is connected between two carrier elements 15a, 15b by means of two fixing elements 16a, 16b with the casing parts 14a, 14b. The rotor 4 rotates about the piezo-element 2 and transfers its force via a ring 17a and a spring component 17b to a drive shaft 18. The drive shaft protrudes through a hole from the upper part 14 of the motor and is thus connected there with the gear wheel 7. In total such a motor can be built very flat and requires no radial bearings as the rotor 4 is centered by the piezo-element 2. In the axial direction wandering of the rotor is prevented by the casing halves 14a, 14b which form an axial bearing. In FIG. 11 such a piezo-electric drive replaces a conventional motor 18 in an electric shaver. Here the motor drives via a gear wheel 7 a gear shaft 20 which in turn causes a cutter head 19 to rotate. The motor is placed in a casing 21 which simultaneously serves as a handle. The radial motor is ideally suited as a drive for a fan, in particular a drive for a fan in a computer. Here an air screw is simply driven by gear wheel 7. The gear wheel 7 can also be replaced directly by the air screw and thus create a direct drive fan.

Figure 10:
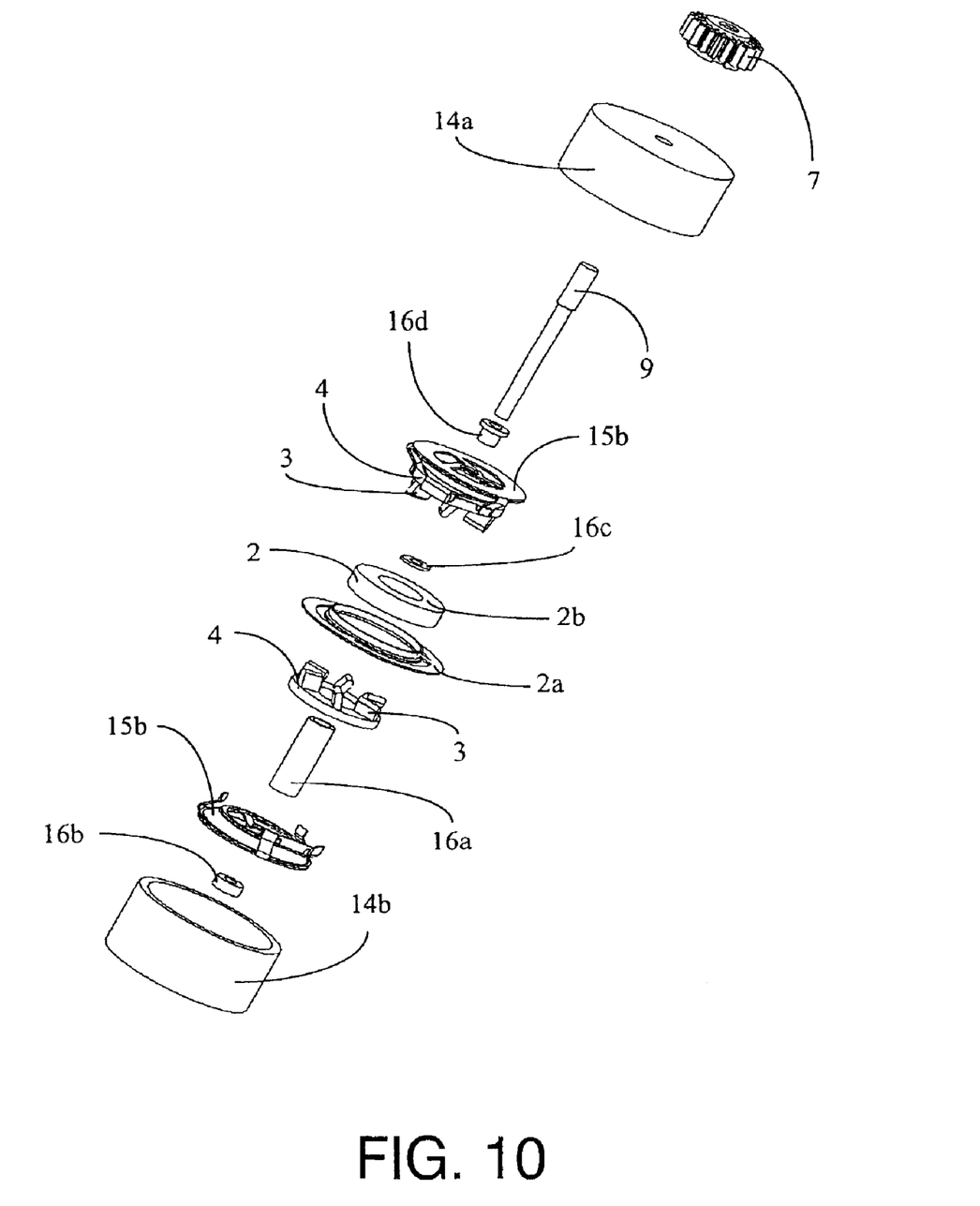
FIG. 10 shows an axial piezo-electric drive as an exploded drawing.

Instead of the radial motor structure described in the above examples an axial construction is also possible. Such an axial motor is shown in FIG. 10. Here the piezo-element 2 is attached to a ring-like stator 2a and drives two rotors 4 which each touch the piezo-element 2 on one side. The stator 2a is clamped between two casing halves 14a and 14b. The rotors 4 have on the side facing away from the piezo-element 2 spring elements 15b which exert the necessary pretension force on the rotors 4. Via a pipe 16a the two rotors 4 and the spring elements 15b are connected to a common shaft 9 and are fixed to the shaft 9 by locking elements 16b, 16c and 16d. The upper casing part 14a as in the radial motor has a hole through which the shaft 9 protrudes outwards. On the outside on the shaft 9 is also mounted a gear wheel 7 which transfers the force of the motor to the components to be driven on the outside. This motor is longer than a comparable radial motor but has a smaller diameter. Such an axial motor can also be used in FIG. 11 instead of a conventional motor 18.

Figure 12:
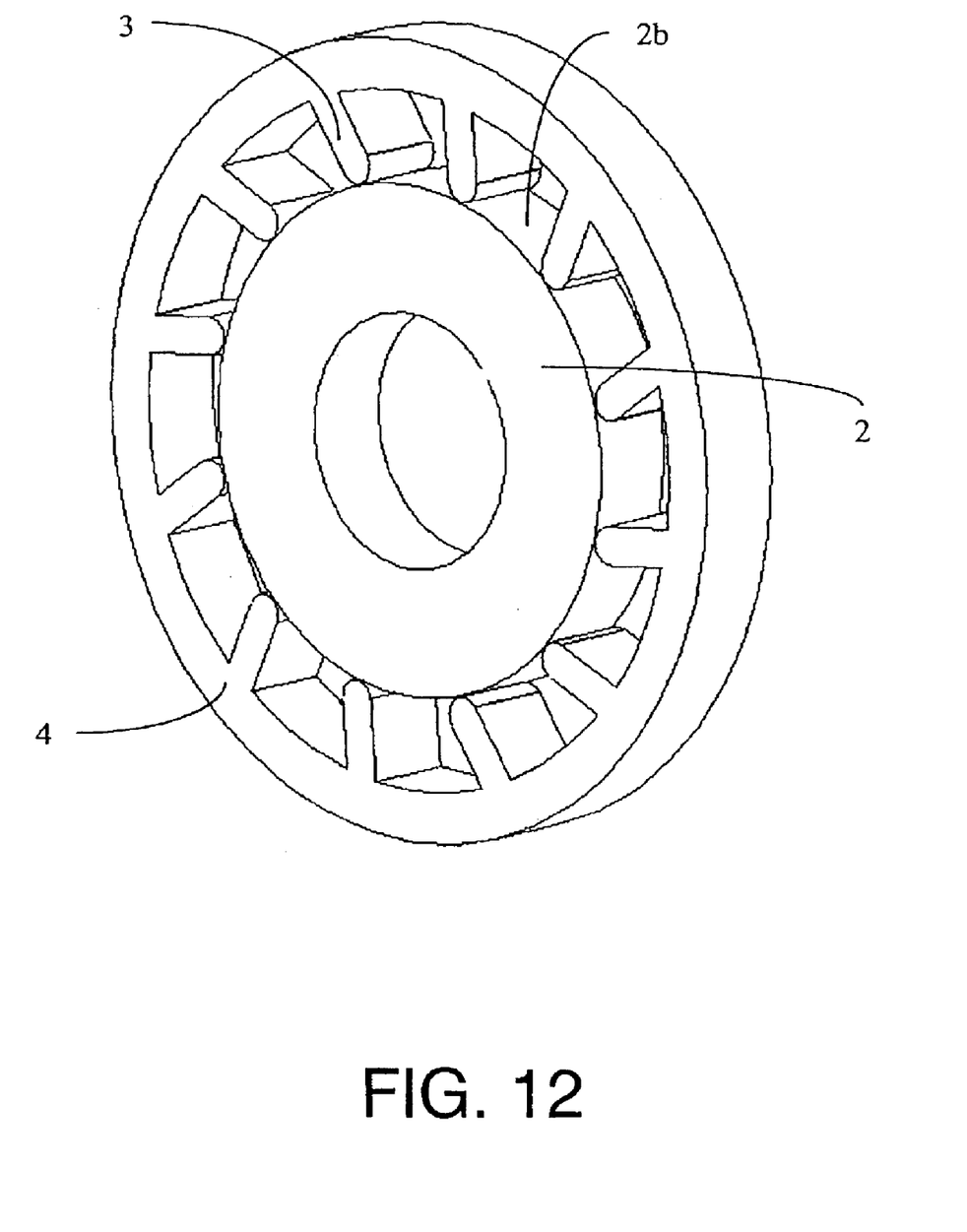
FIG. 12 shows a piezo-electric wheel hub motor.

A radial piezo-electric drive can also be used as a direct drive for the wheel of a vehicle. Such a drive concept shown in FIG. 12 is based on a wheel hub motor. The wheel bearing consists of the radial piezo-element 2 and the wheel rim forms the rotor 4. The pretension force on the rotor 4 is then exerted by the weight of the vehicle. Such a vehicle can easily have all-wheel drive and requires no drive shafts. The piezo-element 2 need merely have a corresponding power supply.

What is claimed is:

1. A piezo-electric drive comprising a stator and a rotor, in which the stator has a cylindrical piezo-element that has at least two electrodes and at least one contact surface and a first resonant frequency, the rotor having a mechanical transfer element between the piezo-element and the rotor, which transfer element has elevations that point at a particular angle into the direction of the contact surface of the piezo-element and under pretension are adjacent to the contact surface and that have a second resonant frequency, and said piezo-element being capable of stimulating vibration of the second resonant frequency in the elevations by periodic exertion of pressure on the elevations, whereby the elevations periodically lift-off from the contact surface and the rotor is set into rotation, the transfer element and the rotor being in the form of an equilateral triangle, a one of the elevations being centered in each triangle side and pointing inwards toward the piezo-element.

2. A piezo-electric drive as claimed in claim 1, wherein the elevations experience an almost equal pretension force acting vertically on the contact surface.

3. A piezo-electric drive as claimed in claim 1, wherein the rotor and the mechanical transfer element are one piece or are firmly connected together.

4. A piezo-electric drive as claimed in claim 1, wherein the piezo-element is coated at least on the contact surface.

5. A piezo-electric drive as claimed in claim 1, wherein the mechanical transfer element has elastic properties and between its elevations a smaller diameter than the piezo-element and is thus pretensioned relative to the piezo-element.

6. A piezo-electric drive as claimed in claim 1, wherein the piezo-electric drive can be operated without an additional bearing in the direction of the pretension force.

7. A piezo-electric drive as claimed in claim 1, wherein to mount the rotor with the mechanical transfer element on the piezo-element an elastic deformation of the rotor and the mechanical transfer element is provided by the exertion of forces on the rotor, so that the diameter between the elevations is larger than that of the piezo-element.

8. A motor for driving rotatable or movable parts with a piezo-electric drive as claimed in claim 1.

9. A motor as claimed in claim 8, wherein the motor is contained in a gear wheel drive mechanism.

10. An electric shaver with rotating cutting tools, wherein a piezo-electric drive as claimed in claim 1, is provided for driving the rotating cutting tools.

11. An electric shaver with rotating cutting tools, wherein the rotating cutting tools are the rotors of a piezo-electric drive as claimed in claim 1.

12. An electrically driven fan, wherein the fan has an air screw which is provided for being driven by a piezo-electric drive as claimed in claim 1.

13. An electric device with a piezo-electric drive as claimed in claim 1.

14. A piezo-electric drive comprising a stator and a rotor, in which the stator has a cylindrical piezo-element that has at least two electrodes and at least one contact surface, the rotor has a mechanical transfer element between the piezo-element element and the rotor, which transfer element has elevations that point at a particular angle into the direction of the contact surface of the piezo-element and under pretension are adjacent to the contact surface, the transfer element and the rotor being in the form of a polygon, a one of the elevations being centered in each side of the polygon and pointing inwards toward the piezo-element.

15. A piezo-electric drive comprising:

a stator having a cylindrical piezo-element, the piezo element having at least two electrodes;

a rotor; and a mechanical transfer element between the piezo-element and the rotor, the transfer element having elevations that point at a particular angle to at least one surface of the piezo-element, wherein the stator is in a casing, the casing being between the transfer element and the at least one surface and having a wall extending substantially perpendicular to the at least one surface.

16. A piezo-electric drive comprising:

a stator having a tube and a cylindrical piezo-element surrounding the tube, the piezo element having at least two electrodes and the tube having at least one contact surface;

a rotor;

a mechanical transfer element between the tube and the rotor, the transfer element having elevations that point at a particular angle to the contact surface, the transfer element and the elevations being held under pretension adjacent to the contact surface.

17. A piezo-electric drive as claimed in claim 16, wherein the piezo-electric drive can be operated without an additional bearing in the direction of the pretension force.

* * * * *